US008374777B2

(12) United States Patent
Reich

(10) Patent No.: US 8,374,777 B2
(45) Date of Patent: Feb. 12, 2013

(54) GPS EQUIPPED DEVICES THAT UTILIZE GEOGRAPHICAL NAVIGATION BUNDLES

(75) Inventor: David E. Reich, Jupiter, FL (US)

(73) Assignee: International Business Machines Corporation, Armonk, NY (US)

(*) Notice: Subject to any disclaimer, the term of this patent is extended or adjusted under 35 U.S.C. 154(b) by 1530 days.

(21) Appl. No.: 11/311,883

(22) Filed: Dec. 19, 2005

(65) Prior Publication Data

US 2007/0143017 A1    Jun. 21, 2007

(51) Int. Cl.
*G06F 3/00* (2006.01)
*G06F 9/445* (2006.01)
*G08G 1/123* (2006.01)
*G01C 21/00* (2006.01)

(52) U.S. Cl. ........ 701/409; 701/412; 701/430; 701/450; 701/484; 701/516; 340/995.12; 717/168; 717/174; 719/331

(58) Field of Classification Search .......... 701/200–202, 701/206–213, 400, 408, 409, 412, 430, 450, 701/461, 468, 484, 516, 517, 522, 532, 538, 701/540; 340/988–990, 995.1, 995.17–995.2, 340/995.12, 995.14, 995.18, 995.19; 717/168, 717/169, 171–178; 719/331, 332
See application file for complete search history.

(56) References Cited

U.S. PATENT DOCUMENTS

| | | | |
|---|---|---|---|
| 5,528,248 A * | 6/1996 | Steiner et al. | 342/357.06 |
| 6,295,502 B1 * | 9/2001 | Hancock et al. | 701/201 |
| 6,430,599 B1 | 8/2002 | Baker et al. | |
| 6,522,875 B1 | 2/2003 | Dowling et al. | |
| 6,680,919 B1 | 1/2004 | Rauhala | |
| 2003/0076792 A1 | 4/2003 | Theimer | |
| 2004/0230370 A1 * | 11/2004 | Tzamaloukas | 701/200 |

FOREIGN PATENT DOCUMENTS

| | | | |
|---|---|---|---|
| JP | 1994227180 A | 3/1995 | |
| JP | 408095488 A | 4/1996 | |
| JP | 2002202135 | 7/2002 | |
| JP | 2002286454 A | 10/2002 | |
| JP | 2003223097 | 8/2003 | |

(Continued)

OTHER PUBLICATIONS

Yangchun, Y., et al., "OSGi Specification Based on "Intelligence" Embedded Application Development, "Smart" Application Development Based on OSGi Specification," Chinese Journal of Scientific Instrument, vol. 25, 2004.

*Primary Examiner* — Thomas Tarcza
*Assistant Examiner* — Edward Pipala
(74) *Attorney, Agent, or Firm* — Patents On Demand P.A.; Brian K. Buchheit; Scott M. Garrett

(57) ABSTRACT

A method for providing and utilizing navigation data can include identifying a grid that includes a plurality of geographical regions. Each geographical region can have an associated navigation data set which includes street level mapping data. Linking references for each geographical region can be defined. Geographical navigation bundles can be identified that conform to an OSGi compliant framework. Each bundle can correspond to one of the geographical regions and can include a navigation data set and a manifest file. The manifest file can include a version, date, and the linking references. A GPS equipped device can dynamically install and activate the geographical navigation bundles. The GPS equipped device can perform at least one navigation process based upon the navigation data set. The GPS device can predict when new navigation data is needed and can automatically acquire suitable geographical navigation bundles in response to these predictions.

20 Claims, 4 Drawing Sheets

FOREIGN PATENT DOCUMENTS

| | | |
|---|---|---|
| JP | 2003223097 A | 8/2003 |
| JP | 200271555 | 9/2003 |
| JP | 2003269990 A | 9/2003 |
| KR | 456377 | 8/2004 |

* cited by examiner

GPS EQUIPPED DEVICES THAT UTILIZE GEOGRAPHICAL NAVIGATION BUNDLES

BACKGROUND

1. Field of the Invention

The present invention relates to the field of navigation devices and, more particularly, to predictive acquisition and utilization of geographical navigation bundles.

2. Description of the Related Art

Global Positioning Systems (GPS) are increasingly being utilized within a variety of devices for navigation purposes. Many of these devices are portable devices designed for personal or vehicle navigation. When used for navigation, the GPS equipped devices must contain mapping data of local terrain and/or roadway information. Providing this information at a low enough granularity to aid with navigation (such as a granularity that includes street level maps) can require substantial quantities of data. Storing this data upon the GPS device requires that the device be equipped with a large data storage space. A data storage space can be a scarce resource of a portable device. Increasing the size of the storage space of a portable device typically entails a proportional increase in the size and/or the cost of the associated device.

Commonly, a portable GPS device will be equipped with a moderately sized storage space that is sufficient to include mapping and/or terrain data for a single journey over a known geographical region. Before a trip, the GPS device can connect to a larger data store from which trip specific information can be obtained. Mapping data for the trip will then be downloaded to the GPS device. This solution is somewhat burdensome to a traveler and can minimize the usefulness of the GPS device when deviations to an original travel plan occur.

It should be appreciated that often the GPS device is most needed at times when these deviations occur, such as when a deviation of a travel plan occurs to avoid an area of traffic congestion. Thus, the GPS device provides insufficient assistance at the times when it is most needed.

As previously noted, size and/or expense constraints often prevent a portable device from storing data for every possible trip or possible trip deviation. For example, most navigation devices do not include mapping data at the street level that includes information for every street in the United States. Even if a portable device were capable of containing all of this data, the majority of this data would rarely, if ever, be utilized. Consequently, a cost of equipping the portable device with an exceptionally large storage space would add to the cost of the device without providing a substantial enough benefit to justify this increased cost. Additionally, information at a low level of granularity is subject to change and therefore requires intermittent updates to be of most use.

Some GPS devices include a wireless communication mechanism that allows mapping data to be updated during a trip. Users must explicitly trigger the updates from the GPS device, which requires the GPS device to have data updating mechanisms and interfaces, which increase the complexity of the device and/or increase the cost of the device. Often these interfaces are difficult to utilize, due to the limited amount of input/output interface components on the device, which are often already overloaded to provide the basic device functionality. Additionally, many geographical regions are outside wireless communication coverage areas. Data cannot be obtained when the GPS device is in such a region.

One utilized GPS technology requires a constant communication connection over which mapping directions are streamed. This technology allows for GPS based mapping to be performed using an extremely thin client which has extremely limited resources. Using this technology, the GPS device can continuously transmit GPS coordinates to a remote server, mapping directions can be determined at the remote server and can be streamed to the device for presentation. This technology is completely dependent upon constant communication connections, which are often unavailable. Additionally, this technology requires that a server exists that is capable of handling constant mapping request from one or more GPS devices.

What is needed is a GPS device which is capable of operating independent of a wireless communication connection and which is capable of updating mapping data during a trip. Preferably, this GPS device will be able to perform these updates automatically without explicit user interaction.

SUMMARY OF THE INVENTION

The present invention discloses a GPS device capable of independent navigation operation that includes a data store for mapping data, a predictive algorithm, and a communication mechanism, where the predictive algorithm automatically determines when to update the navigation data in the data store. The navigation data within the data store can be grouped into one or more different geographical regions. As the GPS device moves among different regions, the navigation data contained within the data store can be dynamically updated to contain data appropriate for the current geographical region within which the GPS device is located. The predictive algorithm can ensure that suitable data is loaded within the data store prior to a time in which the data is actually needed by the GPS device.

The predictive algorithm can be optionally configured to retrieve data far enough in advance to ensure that a lack of wireless connectivity over some geographical regions within which the device is to be used is not problematic. For example, the GPS device could be configured with a 40 mile update buffer region so that all navigation data within the defined buffer region is constantly contained within the device via intermittent updates. So long as the region that lacks wireless connectively is less than or equal to the update buffer region, the GPS device can function without interruption and operate with appropriate navigation data. The mapping data can be configured with different update buffer region sizes depending upon device capabilities, a desired "safety" window, the geographical region in which the device is utilized, and other such factors.

It should be noted that the predictive algorithm can be particularly useful for handling dynamic route changes. For example, the predictive algorithm can automatically acquire navigation information for an unexpected area, after a user of the GPS device has made a wrong turn while driving or taken an unexpected departure from a planned travel path for any reason. Conventional GPS devices and algorithms often rely upon a predetermined route and do not automatically adapt to changes to this predetermined route. While conventional GPS devices often do adapt to route changes, the difficulty in the current state of the art is that unless the GPS user anticipated changes of a magnitude that could necessitate additional detailed data bundles, dynamically changed route information could not be displayed on the device because the data would not be available. The inventive GPS device detailed herein overcomes these problems and provides an extremely flexible, intuitive, and detailed navigation system by delivering the predicted mapping bundles to the device when or before they are needed, relieving the device user from ever having to download any data to the device manually.

In one embodiment, the disclosed GPS device can execute applications conforming to an OSGi framework. Additionally, navigation data for different geographical regions can be included within bundles, which conform to the OSGi framework. That is, the OSGi framework can be adapted for navigation data. Instead of traditional application dependencies that are included within traditional OSGi compliant application bundles, bundles containing geographical region data can be linked to one another based upon an interconnecting geographical grid. That is, each bundle of geographical information (referred to as a geographical navigation bundle) can be linked to or have linking dependencies to other geographical navigation bundles. Thus, two geographically proximately or adjacent geographical regions can be linked to one another.

The present invention can be implemented in accordance with numerous aspects consistent with material presented herein. For example, one aspect of the present invention can include a method for providing and utilizing navigation data. The method can include identifying a grid that includes a plurality of geographical regions. Each geographical region can have an associated navigation data set which includes street level mapping data. Linking references for each geographical region can be defined. Geographical navigation bundles can be identified that conform to an OSGi compliant framework. Each bundle can correspond to one of the geographical regions and can include a navigation data set and a manifest file. The manifest file can include a version, date, and the linking references. A GPS equipped device can dynamically install and activate the geographical navigation bundles. The GPS equipped device can perform at least one navigation process based upon the navigation data set. The GPS device can predict when new navigation data is needed and can automatically acquire suitable geographical navigation bundles in response to these predictions.

Another aspect of the present invention includes a method for obtaining navigational data. The method can include the step of identifying a GPS equipped device configured in accordance with a dynamic application framework. The framework can be a policy free framework within which bundles are deployable. Applications are able to be contained within particular ones of the bundles. The framework can install, update, and remove bundles dynamically at run-time. The framework can also manage dependencies between bundles. The GPS equipped device can present navigation information for a geographical region within which the GPS equipped device is located as determined by GPS coordinates provided by the GPS equipped device. The presented navigation information can be based upon navigation information of a geographical navigation bundle specific to the geographical region. The geographical navigation bundle is a bundle that is deployable within the dynamic application framework. Different geographical navigation bundles that correspond to different geographical regions can be utilized by the GPS equipped device.

Yet another aspect of the present invention can include a method for conveying data to a GPS equipped device. A server can be identified that includes geographical navigation bundles. Geographical navigation bundles can include navigational information for different geographical regions. Each geographical navigation bundle can be a bundle compliant with a dynamic application framework. Requests can be received for selected ones of the geographical navigation bundles from a plurality of remotely located computing devices. Responsive to the requests, the selected ones of the geographical navigation bundles can be conveyed to the requesting computing devices. The computing devices can include navigation components that utilize information contained within the geographical navigation bundles to perform navigation tasks.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
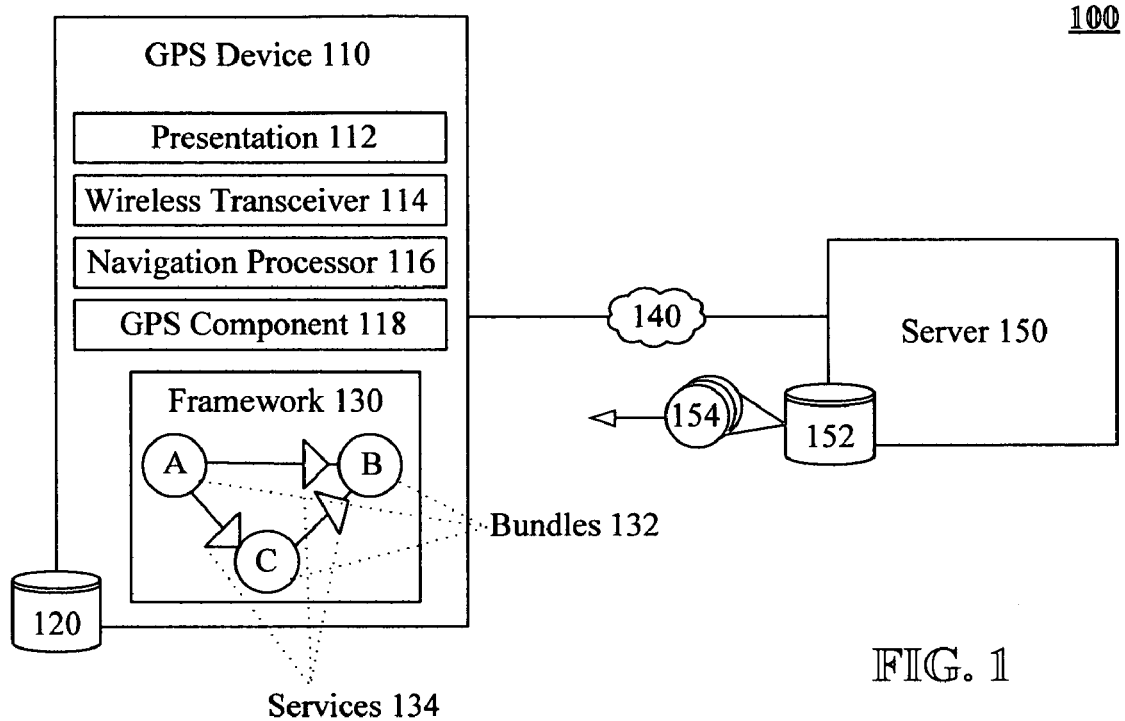
FIG. 1 is a schematic diagram of a system including a GPS equipped device having a predictive algorithm which loads bundles that include geographical region specific navigation data in accordance with an embodiment of the inventive arrangements disclosed herein.

FIG. 1 is a schematic diagram of a system 100 including a GPS equipped device having a predictive algorithm which loads bundles that include geographical region specific navigation data in accordance with an embodiment of the inventive arrangements disclosed herein. System 100 can include a bundle server 150 that is communicatively linked to one or more Global Positioning System (GPS) equipped devices 110 over network 140. The system 150 can access data store 152, which includes a plurality of geographical navigation bundles 154. The server 150 can continuously update the bundles 154 to ensure that each bundle 154 contains accurate information.

A geographical navigation bundle 154 corresponds to a defined geographical region and includes a navigation data set for that geographical region. The navigation data set can include relatively static information, such as street level mappings, terrain and elevation information, and points of interest within the region. The navigation data set can also include dynamic information, such as traffic condition data, weather data, advertisement information, and the like. Each geographical bundle 154 can comply with framework 130 and can therefore be utilized by any device 110 which conforms to framework 130.

The GPS equipped device 110, hereafter referred to as GPS device 110, can be a computing device capable of performing one or more navigation tasks. The GPS device 110 can include, an in-vehicle navigation system, a pedestrian navigation device, a package tracking device, a mobile telephone, a personal data assistant (PDA), a wearable computer, a notebook computer, and other such computing devices. The in-vehicle navigation system can be used with a variety of vehicles, including automobiles, marine vessels, aircraft, and the like.

In one embodiment, the GPS device 110 can perform the navigational tasks in a stand-alone fashion without requiring a continuous network connection to an external server. Although capable of independent operation, the GPS device 110 can optionally receive information from server 150 when a communication connection is available. The received information can include updated information for a current geographical region as well as information for a geographical region which the GPS device 110 is predicted to enter in the future.

GPS device 110 can include a data store 120 which is a local storage space in which navigational information, machine readable code, and the like can be stored. GPS device 110 can also include a presentation component 112, a wireless transceiver 114, a navigation processor 116, a GPS component 118, as well as other components not explicitly shown (such as input components).

The presentation component 112 can include a visual display upon which map images and/or textual information is presented. The presentation component 112 can also include an audio output (port or speaker) through which audio prompts and navigation instructions can be presented.

The wireless transceiver 114 can be any of a variety of components that enable the GPS device 110 to wirelessly receive data over network 140 from server 150. The wireless transceiver 114 can include mobile telephony components, two way radio components, 802.11 family of networking components, BLUETOOTH components, infrared components, and the like.

The GPS component 118 can determine positional information for the GPS device 110. The GPS components 118 can obtain this information from GPS satellites as well as ground relay stations. Typical GPS components 118 can produce a latitude, longitude, and altitude identifier that use a standard coordinate system to determine an absolute location for the GPS device 110. In one embodiment, in addition to or in substitution of the absolute location identifiers, relative location identifiers can be determined by the GPS components 118 and used for navigation.

For example, relative location identifiers can be provided for known landmarks having precise GPS coordinates, which when combined with GPS satellite input can result in extremely accurate positional information. In another example, when within a building, the GPS device 110 can receive positional information of objects and/or rooms of the building proximate to the GPS device 110. In still another example, the GPS device 110 can use localized object detection components to assist a user to avoid roadway obstacles proximate to the GPS device 110.

The navigation processor 116 can include a central processing unit, random access memory (RAM), and other components which the GPS device 110 uses to generate navigation instructions based upon mapping data, data from the GPS components 118, and internal algorithms contained within the GPS device 110. The algorithms used by the navigation processor 116 can include a predictive algorithm to automatically obtain navigational information from server 150 in advance of a need for this information.

The GPS device 110 can conform to standards of framework 130, which can be a dynamical application framework. More specifically, framework 130 can be a policy free framework in which bundles 132 can be deployed. Applications are able to be contained within particular ones of the bundles 132. The framework 130 is able to install, update, and remove bundles 132 dynamically at runtime. Framework 130 can also manage dependencies between bundles 132. Under the framework 130, multiple bundles 132 can be activated and executed within a single virtual machine. In one embodiment, the framework 130 can be an OSGi compliant framework or a derivative thereof.

In framework 130, bundles 132 are able to communicate with one another using defined services 134. At least a portion of the bundles 132 can be geographical navigation bundles 154, which can be obtained from server 150. In one embodiment, the bundles 132 can also include application bundles used to perform application tasks for GPS device 110, which can include navigation tasks.

Data stores 120 and 152 can be physical or virtual storage spaces configured to store digital information. Data stores 120 and 152 can be physically implemented within any type of hardware including, but not limited to, a magnetic disk, an optical disk, a semiconductor memory, a digitally encoded plastic memory, a holographic memory, or any other recording medium. Data stores 120 and 152 can be stand-alone storage units as well as storage units formed from a plurality of physical devices. Additionally, information can be stored within data stores 120 and 152 in a variety of manners. For example, information can be stored within a database structure or can be stored within one or more files of a file storage system, where each file may or may not be indexed for information searching purposes. Further, data stores 120 and 152 can utilize one or more encryption mechanisms to protect stored information from unauthorized access.

Network 140 can include any hardware/software/and firmware necessary to convey data encoded within carrier waves. Data can be contained within analog or digital signals and conveyed though data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network, such as the Internet. Network 140 can also include circuit-based communication components and mobile communication components, such as telephony switches, modems, cellular communication towers, and the like. Network 140 can include line based and/or wireless communication pathways.

Figure 2:
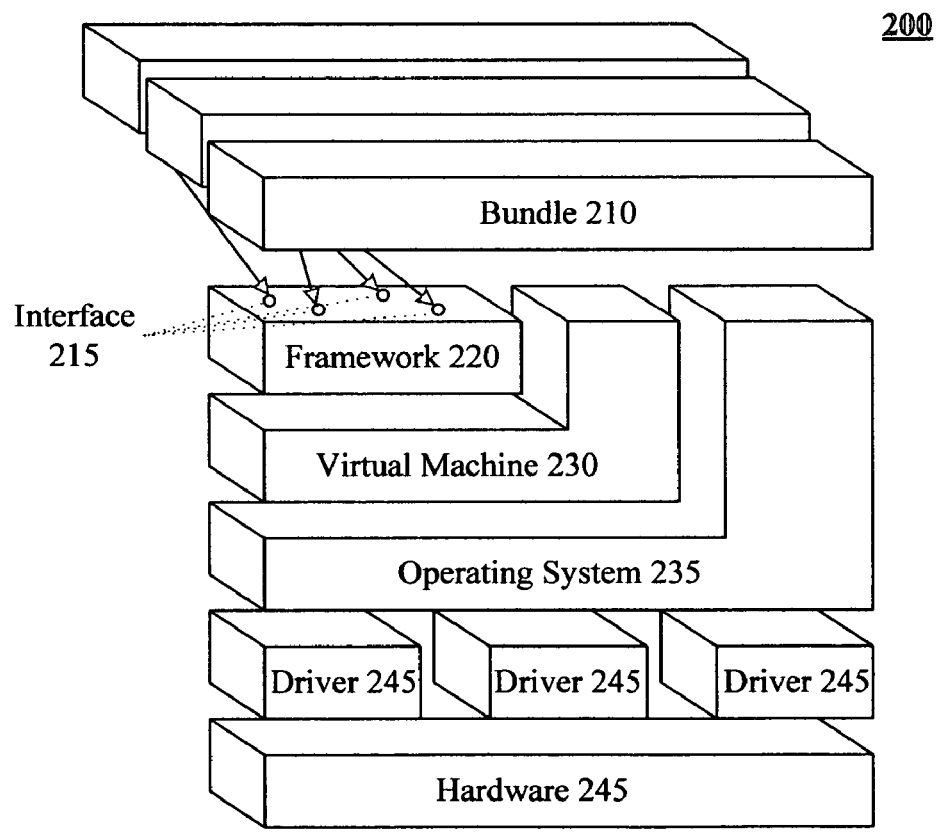
FIG. 2 is a schematic diagram of a framework environment capable of handling geographical navigation bundles in accordance with an embodiment of the inventive arrangements disclose herein.

FIG. 2 is a schematic diagram of a framework environment 200 capable of handling geographical navigation bundles in accordance with an embodiment of the inventive arrangements disclose herein. The environment 200 can be one contemplated embodiment of framework 130. Framework 130 is not to be construed as limited to environment 200 and instead should be interpreted to include any arrangement capable of supporting and managing geographic navigation bundles as defined herein.

Framework 200 can include a bundle layer 210 for application bundles and for geographical navigation bundles. Service interfaces 215 can be imported and exported by bundles (in bundle layer 215) to facilitate data exchange with the framework layer 220. The framework layer 220 can operate within a virtual machine 230, such as a JAVA virtual machine. An operating system layer 235 can be established between the virtual machine 230 and one or more drivers 240. The drivers 140 can interface between the operating system layer 235 and a hardware layer 245.

Figure 3:
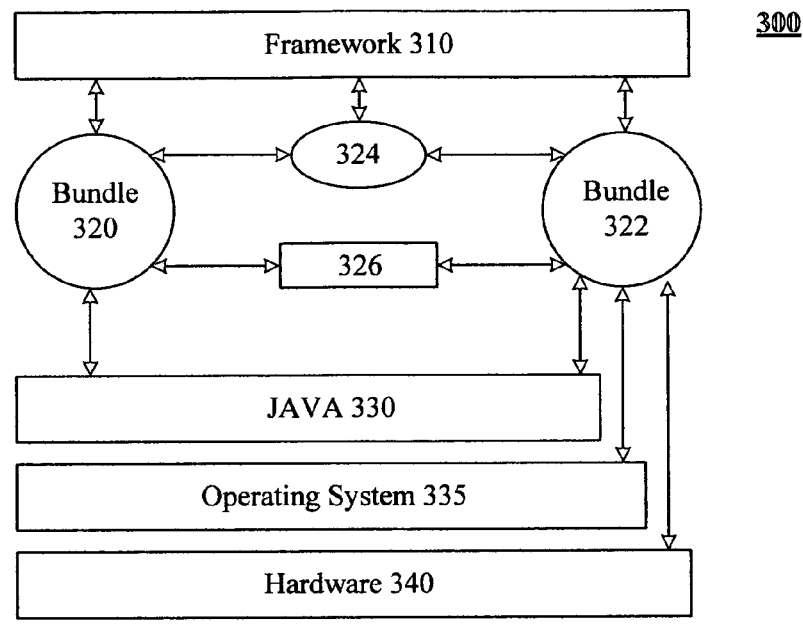
FIG. 3 is a schematic diagram of a collaborative model that permits geographical navigation bundles within a dynamic application framework to exchange information.

FIG. 3 is a schematic diagram of a collaborative model 300 that permits geographical navigation bundles within a dynamic application framework to exchange information. Model 300 is one contemplated mechanism by which bundles 132 communicate. Model 300 can be used in conjunction with environment 200.

Model 300 can include framework 310, which can be a dynamic application framework configured to support geographical navigation bundles. Bundles 320 and 322 can collaborate through service objects and/or package 326 sharing. A service registry 324 can allow bundle 320 and 322 to find and track service objects. Framework 310 can fully manage collaborations between bundle 320 and bundle 322. Bundles 320 and 322 can operate within a JAVA environment 330. An operating system 335 can interface between the JAVA environment 330 and hardware 340 of a GPS device that utilizes bundles 320 and 322.

Figure 4:
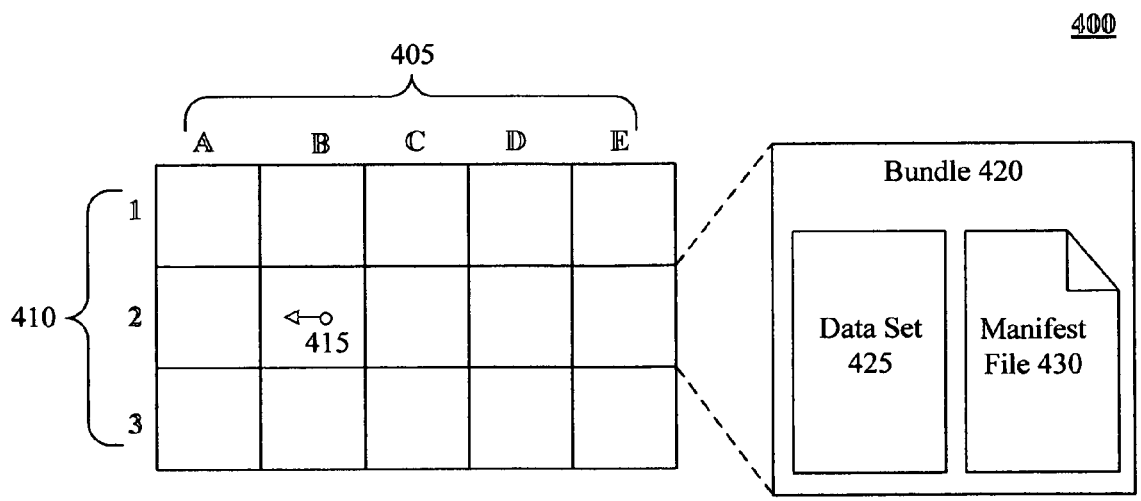
FIG. 4 is a schematic diagram of a system that illustrates a grid of geographical regions, each region being associated with a geographical navigation bundle.

FIG. 4 is a schematic diagram of a system 400 that illustrates a grid 402 of geographical regions, each region being associated with a geographical navigation bundle 420. While a general use of grids for navigational purposes is well known, the coupling of data "bundles" to grid zones as described herein is novel. More specifically, the association and use of bundle 420 for providing navigational information and linking references for other geographical navigation bundles can result in an effective prediction of new grid zones, the automatic delivery of zone based navigational information to a GPS device, and the management and utilization of acquired grid specific information.

The grid 402 includes columns 405 labeled A, B, C, D, and E respectively. Grid 402 includes rows 410 labeled 1, 2, and 3. It should be appreciated that although grid 402 is represented as a simple rectangular grid, individual grids can be of any shape or size. Different grids can have different sizes. Also, grids can be constructed as three dimensional geographical volumes, instead of two dimensional areas.

A GPS device 415 can be included within grid 402, specifically in grid zone B2. The GPS device 415 can move from one grid zone to another within grid 402. Before a new grid zone is entered, a predictive algorithm of GPS device 415 can predict that a new zone will be entered. For example, when the GPS device 415 is moving in an eastern direction (from grid zone B2 to towards grid zone A2), the predictive algorithm can automatically determine that grid zone A2 is being entered. This prediction can be made far enough in advance to ensure that the navigational information for grid zone A2 will be available when needed.

It should be noted that navigation information, such as roadway connections can be used by the predictive algorithm. For instance, if the GPS device 415 is an in-vehicle device traveling on a roadway, the roadway path can be taken into consideration by the predictive algorithm. Hence, if the navigation information indicates that a current road actually curves south so that the vehicle is more likely to enter grid zone B3 than grid zone A2, then the predictive algorithm can predict that grid zone B3 is to be entered and a related geographical navigation bundle can be obtained.

A geographical navigation bundle 420 for a predicted grid zone can be obtained from a remotely located server, if necessary, and placed within a data store local to the GPS device 415. The bundle 420 can be installed and activated by the GPS device 415. It should be noted that the downloading, installing, and activating of a geographical navigation bundle 420 can occur at different times.

The geographical navigation bundle 420 can include a navigation data set 425 and a manifest file 430. The navigation data set 425 can include data used by GPS device 415 to in performing navigation tasks, such as mapping data for some geographical regions in which the GPS device 415 is located.

The manifest file 430 can include a bundle name, version, date, linking references, and other such information. Linking references can indicate how one grid zone or geographical navigation bundle 420 is associated or connects with other grid zones or geographical navigation bundles. Additionally, the manifest file 430 can include hints, algorithms, and heuristics that allow bundles to communicate with each other to indicate when each other bundle is most likely to be needed. Accordingly, predictive processing of a GPS device having activated bundles 420 can be based upon a synthesis of predictive information distributed among two or more different bundles 420.

Figure 5:
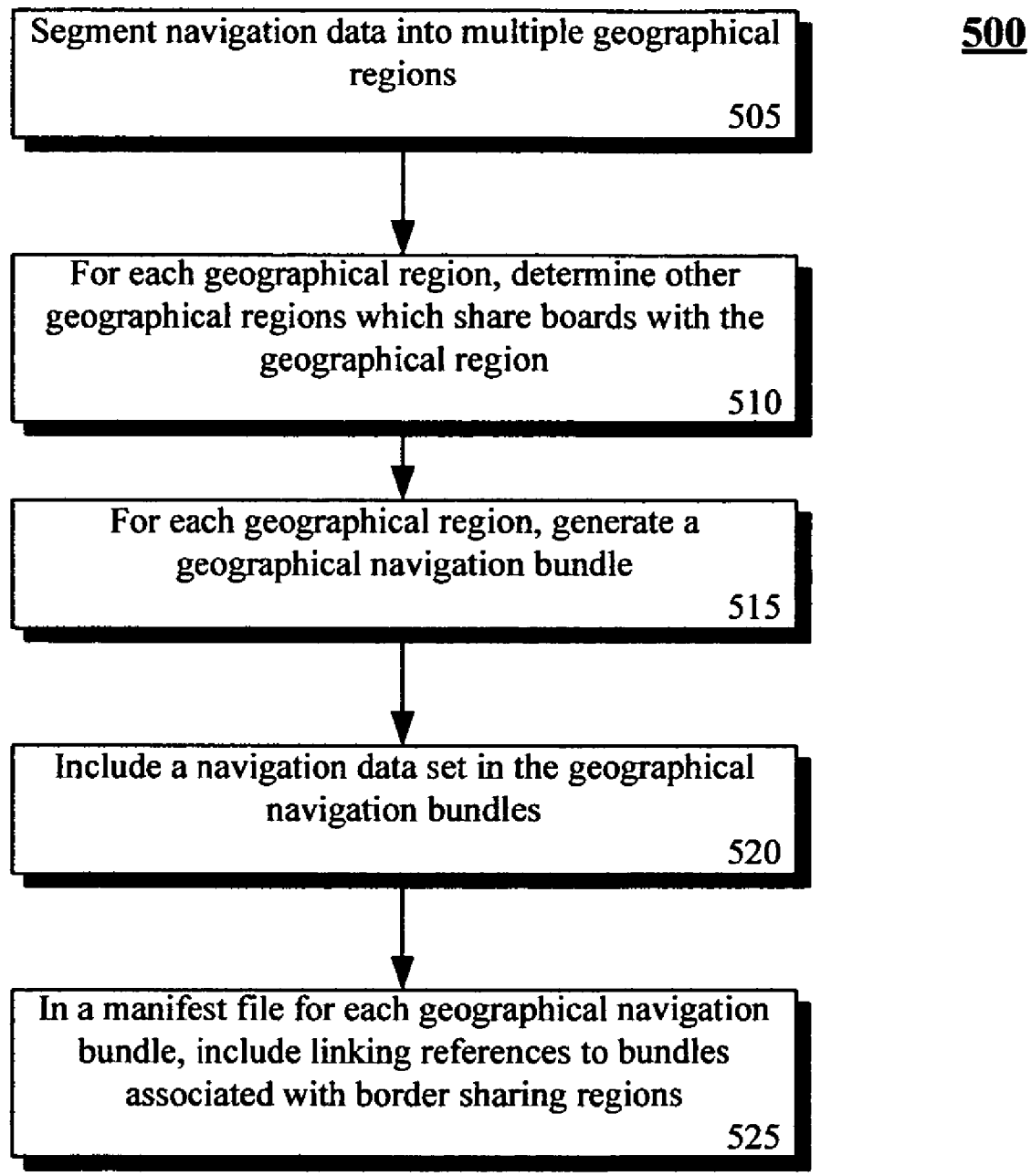
FIG. 5 includes a flow chart of a method for generating geographical navigation bundles in accordance with an embodiment of the inventive arrangements disclosed herein.

FIG. 5 includes a flow chart of a method 500 for generating geographical navigation bundles in accordance with an embodiment of the inventive arrangements disclosed herein. In one embodiment, method 500 can be utilized for the geographical bundles contained within data store 152 and utilized within framework 130. Additionally, method 500 can be used to generate bundles in bundle layer 220 and/or to generate bundle 320 or 322. The method 500 is not limited to these illustrated embodiments, however, and can be utilized for any system that manages and/or uses geographical navigation bundles.

Method 500 can begin in step 505, where navigation data can be segmented into multiple geographical regions. After being segmented, the navigation data for a particular geographical region can be referred to as a navigation data set for that geographical region. In step 510, each other geographical region that shares a boarder with a selected geographical region can be determined.

In step 515, for each geographical region, a geographical navigation bundle can be generated. Each geographical navigation bundle can be a bundle that conforms to an OSGi compliant framework. In step 520, a navigation data set can be included within each geographical navigation bundle. The navigation data set can include all necessary information to permit a GPS equipped device to navigate within a corresponding geographical region.

In one embodiment, the navigation data set can include street level mapping data to permit a GPS device to guide a vehicle through roadways within the corresponding geographical region. The GPS device can function in a stand-alone fashion without requiring a network connection to a remote server once provided with a navigation data set for a region. When the GPS device moves from one geographical region to another, a temporary network connection can be made to a remote server so that new geographical navigation bundles can be obtained.

In step 525, each geographical navigation bundle can also include a manifest file in accordance with the OSGi compliant framework. The manifest file can include linking references to bundles associated with boarder sharing regions. For example, a geographical region designated B2 can share a geographical border with a geographical region designated A2 and can share a boarder with a geographical region designated B3. The linking reference for a bundle for B2 can link to bundles associated with regions A2 and B3. When a GPS device located within B2 is moving in the direction of A2, the linking reference can trigger the GPS device to automatically load the bundle for A2 once configurable conditions are satisfied. Similarly, when conditions are satisfied, the linking reference can trigger the GPS device to automatically load the bundle for B3. Conditions can include such factors as, rate of movement, distance to border A2, estimated time for activating a bundle, available resources of GPS device, and the like. Each geographical navigation bundle can include bundle specific linking references.

The manifest file can also include a date and a version indicator which can be used to facilitate updating the bundle. That is, a GPS device can be provided with two different versions of the same geographical navigation bundle, one representing an updated version of the other. The GPS device can determine from the date and version indicator which version is more current.

It should be appreciated that geographical navigation bundles can be updated as information in an associated navigation data set changes. For example, the geographical navigation bundle should be updated when a new road is constructed within the geographical region. In one embodiment, a navigation data set can include dynamic data, such as traffic conditional of included roads, which can result in frequent updates to the dynamic data being required. When a navigation data set for a geographical region includes both static and dynamic data, two different geographical navigation bundles can be used; one containing the static data and the other containing the dynamic data.

The updates can occur with sufficient frequency to ensure the GPS device includes approximately current navigation information. Approximately current navigation information can be defined as navigational information current enough that a user relying upon it for navigational purposes will not be mislead or confused. For example, if roadway information is approximately current, a driver using a GPS device to navigate will not be directed to travel along a roadway that no longer exists. Similarly, approximately current traffic information is information is recent enough information that a GPS device will assist a driver to avoid areas of congestion and other roadway problems.

Figure 6:
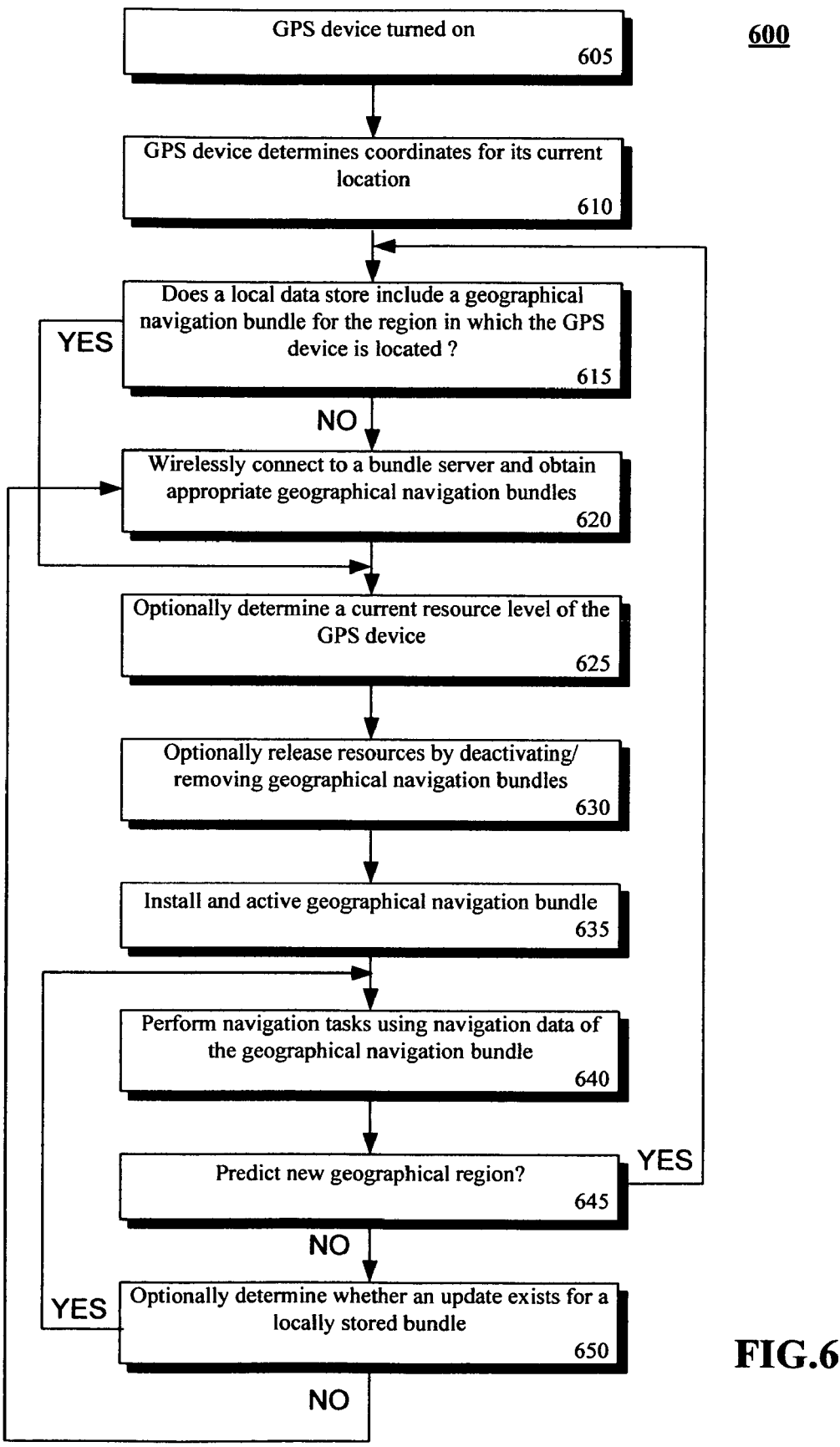
FIG. 6 is a flow chart for a method for a GPS device to utilize geographical navigation bundles in accordance with an embodiment of the inventive arrangements disclosed herein.

FIG. 6 is a flow chart for a method 600 for a GPS device to utilize geographical navigation bundles in accordance with an embodiment of the inventive arrangements disclosed herein. In one embodiment, method 600 can be utilized.

Method 600 can begin in step 605 when a GPS device is powered on or activated. In step 610, the GPS device can determine the coordinates for its current location. In step 615, a determination can be made as to whether a local data store of the GPS device includes a geographical navigation bundle for the region in which the device is located. If the local data store does include a suitable bundle, the method can skip to step 625. If no such bundle is locally stored, the method can proceed from step 615 to step 620. In step 620, the GPS device can wirelessly connect to a bundle server and obtain a suitable geographical navigation bundle. The obtained bundle can be stored in the local data store.

In step 625, the GPS device can optionally determine current available resources. In step 630, if resources are scarce or consumed by presently non-needed geographical navigation bundles, non-needed bundles can be deactivated and/or removed. For example, if the current location of the GPS device makes it unlikely that a loaded bundle will be needed (determined by configured parameters and thresholds) that bundle can be removed and/or deactivated. In step 635, the geographical navigation bundle for the devices' current location can be installed and activated.

In step 640, one or more navigation tasks can be performed using navigational data that was included within the activated geographical navigation bundle. In step 645, the GPS device can predict whether the GPS device is approaching a new geographical region, utilizing one or more prediction factors and a prediction algorithm of the GPS device. If a new geographical region is predicted, the method can loop from step 645 to step 615.

Otherwise, the method can proceed to step 650, where the GPS device can optionally determine whether an update exists for a locally stored geographical navigation bundle, such as the bundle from which currently utilized navigation data was obtained. Step 650 can require that the GPS device submits a query over a wireless network to a remotely located bundle server. If an update is required, the method can loop to step 620, where bundle updates can be downloaded from a bundle server. If no updates are necessary, the method can loop to step 640, where additional navigation tasks can be performed.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for providing navigation data in a global positioning system (GPS) equipped device, the method comprising:
   identifying a grid that includes a plurality of geographical regions, each geographical region having an associated navigation data set which includes street level mapping data;
   defining linking references for each geographical region which define boundaries of that geographical region and specifies at least one other geographical region with which a boundary is shared;
   identifying a plurality of geographical navigation bundles, each geographical navigation bundle being a bundle that conforms to a dynamic application framework, said dynamic application framework for installing, updating, and removing bundles dynamically at runtime, said dynamic application framework conforming to a framework comprising a plurality of abstraction layers defined by open standards, said abstraction layers comprising a bundle layer, a framework layer, a virtual machine layer, an operating system layer, and a hardware layer, said bundle layer exchanging data with said framework layer, which exchanges data with said virtual machine layer, which exchanges data with said operating system layer, which exchanges data with the hardware layer, said framework layer comprising a plurality of service interfaces, which said geographic navigation bundles import and export to facilitate data exchange between themselves and the framework layer, wherein, each geographical navigation bundle corresponding to one of the geographical regions, each geographical navigation bundle including the navigation data set for an associated geographical region, wherein each geographic navigation bundle includes a manifest file that comprises linking references to other geographical navigation bundles, said manifest file comprising descriptive data about the geographic navigation bundle needed for the geographic navigation bundle to conform to the dynamic application framework;

a computing device utilizing the geographical navigation bundles to perform a plurality of navigation tasks;

a computing device utilizing GPS coordinates to automatically determine within which of the geographical regions the GPS equipped device is located; and a computing device installing a selected one of the geographical navigation bundles that corresponds to the determined geographical region.

2. The method of claim 1, wherein said computing device is a global positioning system (GPS) equipped device, said method further comprising:

the GPS equipped device dynamically installing the selected one of the geographical navigation bundles that corresponds to the determined geographical region.

3. The method of claim 2, further comprising:

the GPS equipped device automatically predicting that the GPS equipped device will be entering a different geographical region;

before entering the different geographical region, the GPS equipped device receiving a different geographical navigation bundle for the different geographical region;

installing and activating the different geographical navigation bundle; and while located within the different geographical region, the GPS equipped device performing at least one navigation process based upon the region navigation data set associated with the different geographical navigation bundle.

4. The method of claim 3, wherein the GPS device includes a plurality of installed and activated geographical navigation bundles, wherein before the predicting step, the different geographical navigation bundle is not included in the plurality of installed and activated geographical navigation bundles, said method further comprising:

responsive to the predicting step, the GPS equipped device deactivating and removing one of the plurality of geographical navigation bundles to free up resources for the different geographical navigation bundle.

5. The method of claim 1, wherein the linking references are managed as dependencies by the dynamic application framework.

6. The method of claim 1, wherein at least one GPS device is configured to install and activate a plurality of geographical navigation bundles within a single virtual machine of the GPS equipped device.

7. The method of claim 6, wherein the manifest files for the plurality of geographical navigation bundles include a version and a date, said method further comprising:

the GPS equipped device automatically checking a remotely located server for updates to currently installed ones of the geographical navigation bundles; and when updates are available, the GPS equipped device dynamically updating at least one of the installed geographical navigation bundles via the remotely located server.

8. The method of claim 1, wherein the installed geographical navigation bundle includes approximately current traffic information for streets within a corresponding geographical region.

9. The method of claim 1, wherein the installed geographical navigation bundle includes advertisement information specific to businesses located within a corresponding geographical region.

10. A method for obtaining navigational data comprising:

identifying a Global Positioning System (GPS) equipped device configured in accordance with a dynamic application framework, wherein said framework is a policy free framework within which a plurality of bundles are deployable, wherein applications are able to be contained within particular ones of the bundles, wherein the framework is configured to install, update, and remove bundles dynamically at run-time, and wherein the framework manages dependencies between bundles; and the GPS equipped device presenting navigational information for a geographical region within which the GPS equipped device is located as determined by GPS coordinates provided by the GPS equipped device, wherein the presented navigational information is based upon a geographical navigation bundle specific to the geographical region, wherein said geographical navigation bundle is a bundle that is deployable within the dynamic application framework, wherein different geographical navigation bundles that correspond to different geographical regions are utilized by the GPS equipped device.

11. The method of claim 10, further comprising:

the GPS equipped device automatically predicting that the GPS equipped device will be entering a different geographical region;

before entering the different geographical region, the GPS equipped device receiving a different geographical navigation bundle;

installing the different geographical navigation bundle; and when located within the different geographical region, the GPS equipped device presenting navigation information based upon the different geographical navigation bundle.

12. The method of claim 11, wherein the different geographical navigation bundle is received over a wireless communication channel from a remotely located server.

13. The method of claim 10, wherein the geographical navigation bundle is received over a wireless communication channel from a remotely located server, wherein the geographical navigation bundle includes street level navigational information, said geographical navigation bundle also including approximately current traffic information for streets included within the geographical region.

14. The method of claim 10, wherein the geographical navigation bundle is received over a wireless communication channel from a remotely located server, wherein the geographical navigation bundle includes advertisement information specific to businesses located within the geographical region, said method further comprising:
the GPS equipped device presenting different advertisements for different ones of the businesses based upon the advertisement information.

15. The method of claim 10, wherein the GPS equipped device utilizes functions of a navigation application to perform navigation processes that generate the navigation information of the presenting step, wherein said navigation application is associated with a bundle deployed within the dynamic application framework.

16. The method of claim 10, wherein the dynamic application framework is an OSGi compliant framework.

17. A method for conveying data to a global positioning system (GPS) equipped computing device comprising:
identifying a server including a plurality of geographical navigation bundles, said geographical navigation bundles including navigational information for different geographical regions, wherein each geographical navigation bundle is a bundle compliant with a dynamic application framework, wherein said framework is a policy free framework within which the plurality of bundles are deployable, wherein the framework is configured to install, update, and uninstall the bundles dynamically at run-time, and wherein the framework manages dependencies between bundles;
receiving requests for selected ones of the geographical navigation bundles from a plurality of computing devices; and
responsive to the requests, conveying the selected ones of the geographical navigation bundles to the computing devices, wherein the computing devices include GPS equipped devices that utilize information contained within the geographical navigation bundles to perform navigation tasks.

18. The method of claim 17, wherein at least a portion of the geographical navigation bundles include street level navigation information and further include approximately current traffic information for streets included within a corresponding geographical region, wherein said approximately current traffic information is continuously updated as traffic conditions change.

19. The method of claim 17, wherein at least a portion of the geographical navigation bundles include advertisement information specific to businesses located within a corresponding geographical region, wherein the GPS equipped devices are configured to present the advertisement information.

20. The method of claim 17, wherein the dynamic application framework conforms with standards of OSGi framework R4 Core version.

\* \* \* \* \*